United States Patent [19]

Morel et al.

[11] Patent Number: 4,577,484

[45] Date of Patent: Mar. 25, 1986

[54] HYDRAULIC SAFETY DEVICE FOR A MECHANISM FOR CLOSING UP THE ROLLS OF A ROLLING MILL

[75] Inventors: Michel Morel, Chelles; Bernard Pillac, Montrouge, both of France

[73] Assignee: CLECIM, Courbevoier, France

[21] Appl. No.: 630,170

[22] Filed: Jul. 12, 1984

[30] Foreign Application Priority Data

Jul. 22, 1983 [FR] France ................... 83 12148

[51] Int. Cl.[4] ........................................... B21B 31/32
[52] U.S. Cl. ..................................... 72/245; 72/238; 72/248; 91/519; 91/400
[58] Field of Search ................ 72/238, 245, 248; 91/400, 519

[56] References Cited

U.S. PATENT DOCUMENTS 3,736,782 6/1973 Fujino et al. ..................... 72/245
4,367,763 1/1983 Brand ................................. 91/356

Primary Examiner—Lowell A. Larson
Assistant Examiner—Jorji M. Griffin
Attorney, Agent, or Firm—Pollock, Vande Sande & Priddy

[57] ABSTRACT

Hydraulic safety device for the mechanism for closing up the rolls of a rolling mill, comprising an hydraulic safety valve (20) which is accommodated directly inside the jack (1) for closing up the mill rolls and which automatically reduces the pressure of the fluid in the control chamber (12) as soon as the stroke of the body (11) of the jack reaches a predetermined limiting position.

5 Claims, 2 Drawing Figures

HYDRAULIC SAFETY DEVICE FOR A MECHANISM FOR CLOSING UP THE ROLLS OF A ROLLING MILL

FIELD OF THE INVENTION

The present invention relates to an hydraulic safety device for the mechanism for closing up the rolls of a rolling mill.

BACKGROUND OF THE INVENTION

A rolling mill, intended especially for processing metal materials, consists of a housing incorporating several vertically aligned rolls, which include two working rolls of relatively small diameter serving to reduce a metal strip passed between them. The working rolls are connected either directly or by means of other rolls to one or more control members which determine their displacement relative to the vertical uprights of the housing, in order to adjust the distance between them under no load or under load as a function of the desired thickness of the rolled product.

One of these control members serving to displace the rolls generally consists of an hydraulic jack which has a plunger piston function as an hydraulic piston and which possesses a body surrounding the piston, and these can slide axially relative to one another.

At certain times during the running of the rolling mill, for example during maintenance operations, and more particularly during the replacement of mill rolls when they are worn, or when the rolling mill has another control system, the hydraulic jack can execute its entire stroke without encountering any mechanical resistance, with the the result that if the hydraulic jack is accidentally put under pressure again, for example because of a failure of the pressurized-fluid control system or because of an incorrect operation, it is possible for the thrust bearing provided in the lower part of the piston to be damaged, since it is naturally not designed to withstand a heavy load.

For this purpose, to prevent damage to the thrust bearing of the jack, there are known safety devices which limit the stroke of the latter and which consist of electrical position sensors which, by means of solenoid valves, cut off the supply of pressurized fluid when the body descends to a certain level. However, these sensors require frequent adjustments and are of uncertain reliability, since they are permanently in contact with the rolling liquid and/or its vapors and/or grease and/or metal particles.

SUMMARY OF THE INVENTION

The invention which overcomes such disadvantages therefore applies to a rolling mill comprising:
working rolls between which the product undergoing rolling is passed, and
an hydraulic jack which either directly or indirectly adjusts the clearance between the working rolls, the said jack consisting of a fixed or movable piston and of a movable or fixed body surrounding the piston in the shape of a casing and forming with the said piston a control chamber connected to the device supplying the pressurized fluid.

According to the invention, the safety device comprises an hydraulic valve which is accommodated directly inside the jack and which automatically reduces the pressure of the fluid in the control chamber as soon as the stroke of the jack body reaches a specific limiting position.

BRIEF DESCRIPTION OF THE DRAWINGS

Other characteristics and advantages of the invention will emerge from the detailed description of the following exemplary embodiment illustrated in the attached drawings.

DETAILED DESCRIPTION

Figure 1:
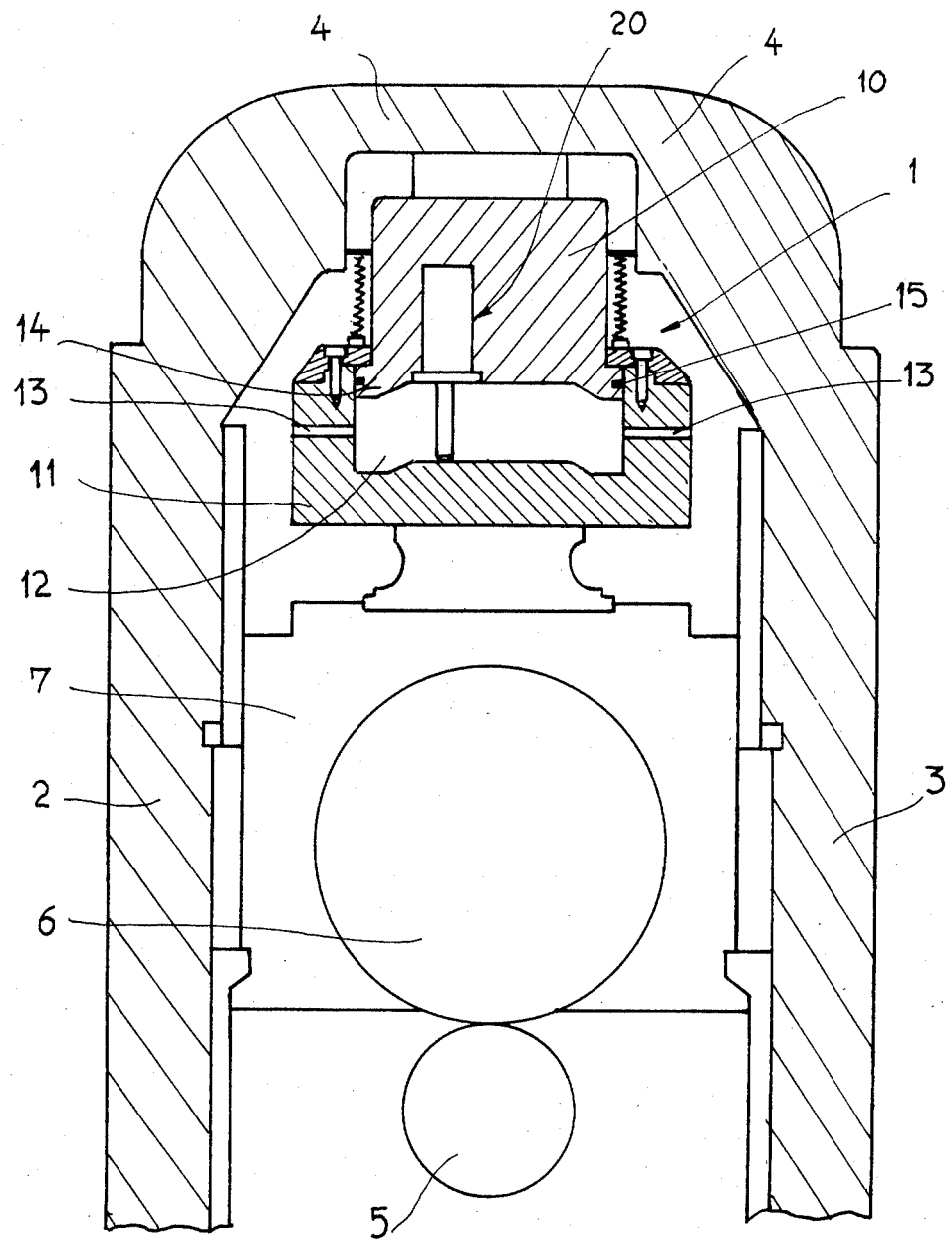
FIG. 1 shows a partial diagrammatic view, in vertical section, of a rolling mill equipped with the safety device according to the invention.

FIG. 1 shows, the uprights 2 and 3 of a frame of a rolling mill housing, which are connected by an upper cross member 4. This rolling mill comprises, on the one hand, an upper working roll 5 of small diameter and an upper supporting roll 6 and, on the other hand, symmetrically a lower working roll and a lower supporting roll (not shown). The plummer block 7 of the upper supporting roll 6 is in contact with an hydraulic jack designated as a whole by reference symbol 1.

The hydraulic jack 1 consists of a fixed piston 10 supported by the upper cross member 4 and of a body 11 carrying the plummer block 7 of the upper supporting roll 6. The body 11 surrounds the piston 10 in the shape of a casing and forms with the said piston a control chamber 12 connected by ducts 13 to the device supplying pressurized hydraulic fluid. The piston 10 possesses in its lower part of annular rim 14. The leak-proofing of the control chamber 12 is ensured by means of gaskets 15 provided on the annular rim 14.

Mounted directly within the piston 10 is an hydraulic safety valve 20 which automatically releases the pressure in the chamber 12 when the body 11 reaches a specific position.

Figure 2:
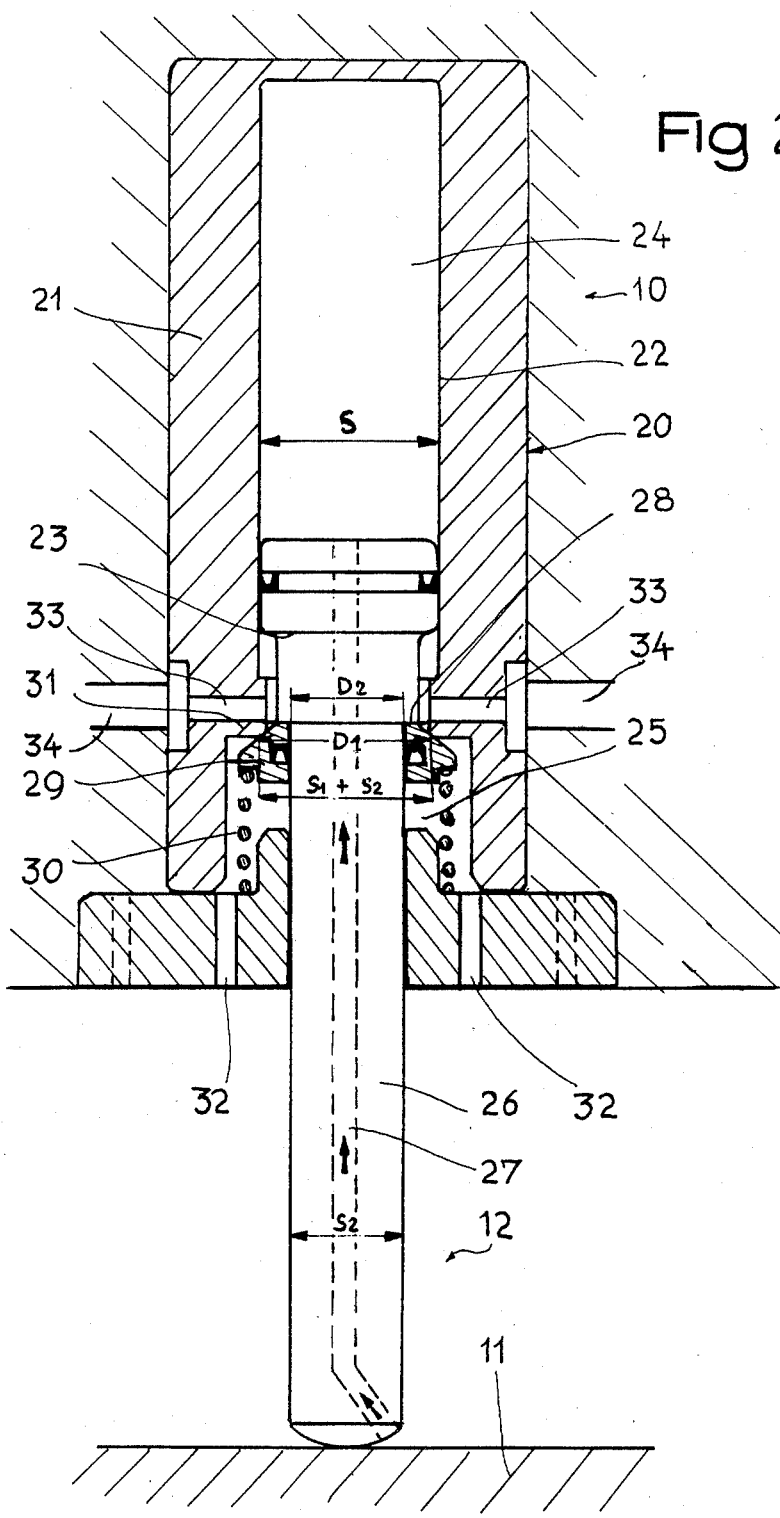
FIG. 2 shows a view of the safety device in vertical section, on a larger scale.

This hydraulic valve 20 (FIG. 2) consists of a cylinder 21 which fits into a recess provided inside the piston 10, the said cylinder having a central bore 22 in which slides a small piston 23 of cross-section S, which separates this bore into an upper chamber 24 and a lower chamber 25. The small piston 23 is extended downwards by a rod 26 of cross-section $S_2$, which passes through the lower chamber 25 of the valve 20 and the control chamber 12 of the hydraulic jack 1, in such a way that its end is in contact with the body 11 of the jack. The piston 23 and the rod 26 possess over their entire length an orifice 27 which puts the pressure chamber 12 in communication with the upper chamber 24 of the valve 20. The diameter of the rod 26 is less than the diameter of the piston 23, so as to form a circular shoulder 28.

Mounted in the lower chamber 25 so as to slide on the rod 26 is a discharge flap 29 which is returned upwards by a spring 30 and as a result of the pressure exerted on the circular surface $S_1$, delimited by the diameters $D_1$ and $D_2$, against a seat 31 provided inside the cylinder 21. The control chamber 12 and the lower chamber 25 communicate with one another via apertures 32. On the other hand, the cylinder 21 incorporates above the seat 31 orifices 33 for the passage of the pressurized fluid at the moment when the flap 29 opens. These orifices 33 are placed so as to match up with orifices 34 perforated in the piston 10 and themselves connected to the return of the hydraulic system.

During an operation involving, for example, changing the rolls of the rolling mill, the body 11 of the jack is detached from the plummer block 7 of the upper supporting roll 6 and thus becomes free. If the jack is accidentally put under pressure again during this operation, the safety device described above operates as follows:

The pressurized fluid admitted into the chamber 12 of the jack via the ducts 13 penetrates simultaneously into the upper chamber 24 via the orifice 27 and into the lower chamber 25 of the valve 20 via the apertures 32, but it cannot pass through the orifices 33, since the flap 29 is retained up against its seat as a result of the pressure of the fluid and the spring 30. The assembly consisting of the piston 23 and the rod 26 therefore follows the displacements of the body 11. As soon as the travel of the body 11 reaches a specific position corresponding to the travel triggering the start of the safety device, the circular shoulder 28 comes in contact with the flap 29. Subsequently, if the travel of the body 11 continues, the force exerted on the rod 26 and directed downwards, namely $P(S-S_2)$, is greater than the opposing force directed upwards by the discharge flap 29: $P S_1 + T$, T being the force exerted by the spring 30.

The following is therefore valid:

$$PS > P(S_1 + S_2) + T$$

where S represents the cross-section of the piston, $S_1$ the cross-section of the flap 29 and $S_2$ the cross-section of the rod 26, thus causing, by means of the shoulder 28, the opening of the flap 29 and the passage of the pressurized fluid from the chamber 12 towards the outlet orifices 33. The chamber 12 therefore becomes subjected to a reduced pressure Pr defined by the equation $$Pr \cdot S = PR(S_1 + S_2) + T$$

i.e.:

$$Pr = T/S - (S_1 + S_2)$$

Safety is consequently absolute, the safety device causing decompression of the hydraulic jack.

This device, placed in the hydraulic mechanism for closing up the rolls of the rolling mill, therefore acts directly on the pressurized fluid, without any intermediate member, in order to limit the pressure of the body of the jack at the end of the stroke of the latter and prevent any damage to this jack, for example during operations in which it can execute its entire stroke without encountering any mechanical resistance.

The safety system can also be arranged in the body of the hydraulic jack.

We claim:

1. An hydraulic safety device for a mechanism for closing up the rolls of a rolling mill comprising working rolls between which a product to be rolled is passed, and an hydraulic jack for controlling the pressure for closing up said rolls, said hydraulic jack consisting of first and second elements comprising a fixed element and a movable element, one of said elements comprising a piston and the other element a casing surrounding said piston, said two elements being slidably axially movable with respect to one another and delimiting a control chamber connected with a system for supplying pressurized hydraulic fluid comprising a supply duct and a return duct, said safety device comprising (a) a discharge flap slidably mounted for closing at least one outlet orifice at said control chamber, said outlet orifice being connected with said return duct for reducing the pressure in said control chamber by passage of hydraulic fluid when said discharge flap is opened;
    (b) a rod slidably mounted parallel to said axis on said first element of said jack and extending within said control chamber; and
    (c) means for applying said rod against said second element of said jack, said rod following the displacement of said second element;
    (d) said rod comprising means for opening said discharge flap for a predetermined limiting position as soon as the stroke between said first and second elements of said jack reaches a predetermined limit.

2. A device as claimed in claim 1, wherein said rod is connected to a small piston sliding within a central bore of a cylinder which fits into a recess provided within said first element of said jack, said piston separating said central bore into an upper chamber and a lower chamber through which said rod passes.

3. A device as claimed in claim 2, wherein said discharge flap is slidably mounted on said rod within said lower chamber and is returned upwards by a spring against a seat provided with said lower chamber of said central bore, said outlet orifice being provided between said small piston and said seat.

4. A device as claimed in claim 2, wherein said means for applying said rod against said second element of said jack comprises said small piston, said rod being provided over its entire length with an orifice for connecting said upper chamber with said control chamber.

5. A device as claimed in claim 3, wherein said means for opening said discharge flap consists of a circular shoulder formed on said rod between said small piston and said seat, said shoulder being provided to open said flap by contacting it when the travel of said rod following said second element reaches a predetermined position, the force applied by the pressure in said upper chamber being greater than the opposing force exerted on said flap by said spring and by the pressure in said lower chamber, said lower chamber being connected with said control chamber.

* * * * *